Jan. 10, 1933.  J. C. BOHMKER  1,893,694

INCUBATOR

Filed May 11, 1931    3 Sheets-Sheet 1

Witness
Arthur M. Franke.

Inventor
John C. Bohmker.
Rummler, Rummler
& Woodworth Attys.

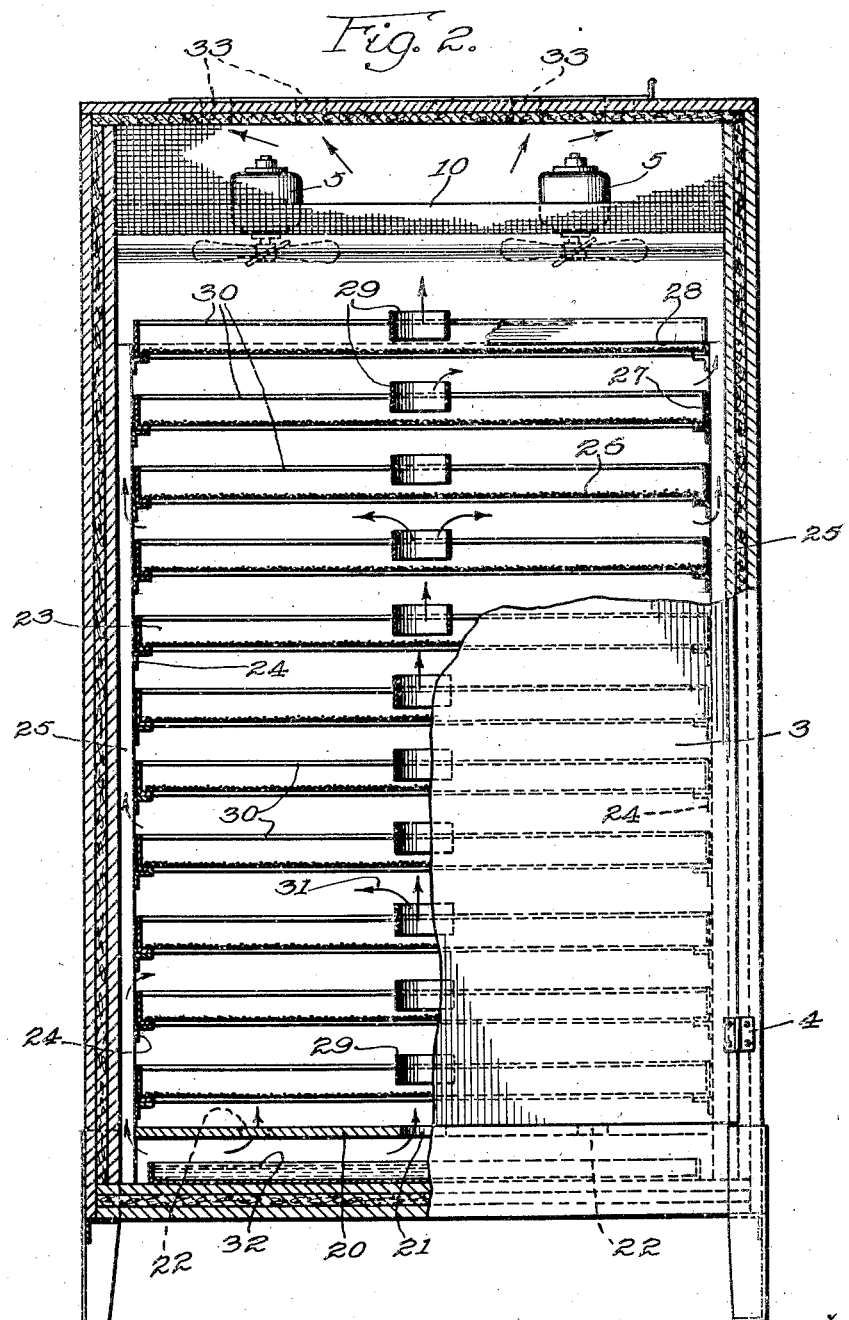

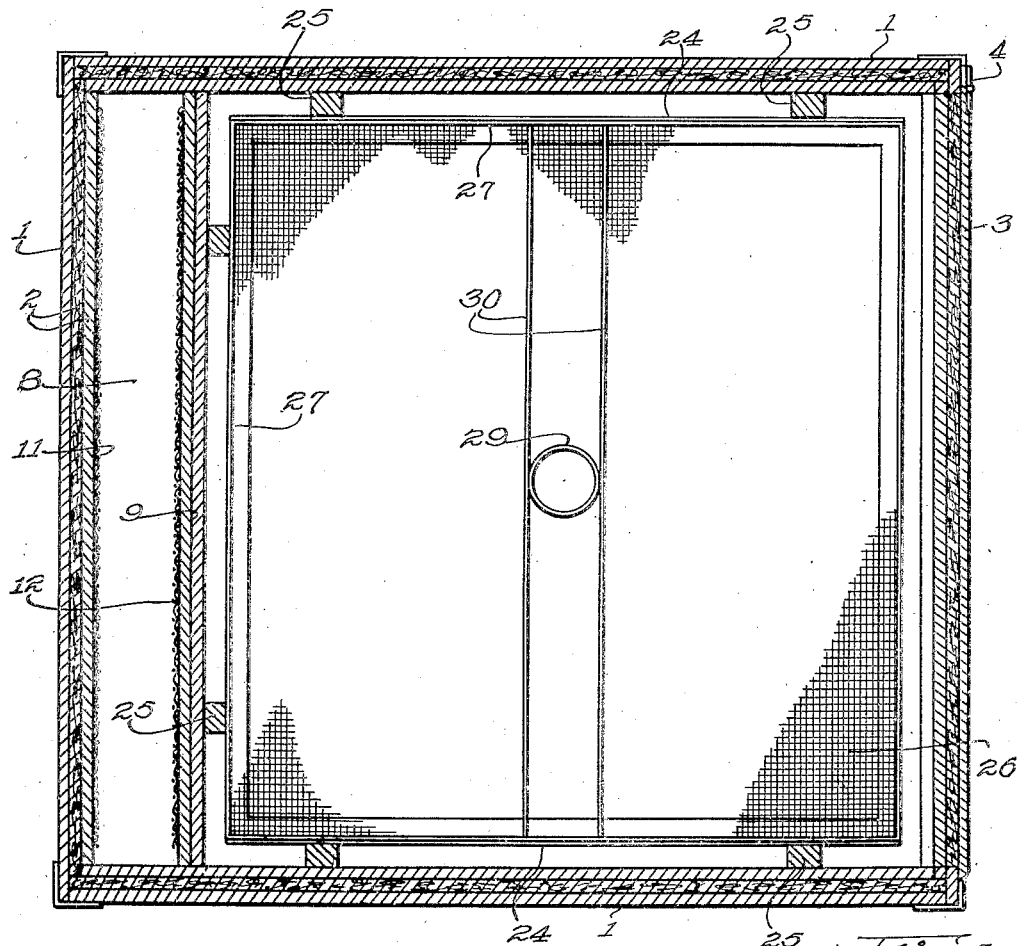
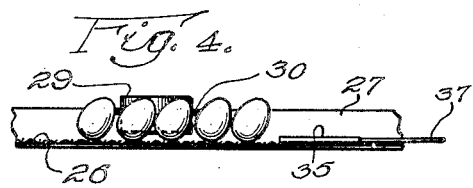
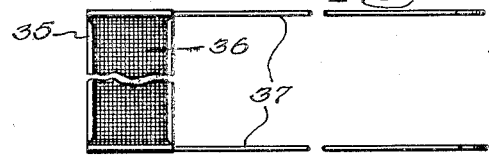

Patented Jan. 10, 1933

1,893,694

UNITED STATES PATENT OFFICE

JOHN C. BOHMKER, OF KANKAKEE, ILLINOIS

INCUBATOR

Application filed May 11, 1931. Serial No. 536,413.

This invention relates to the construction of incubators, with particular reference to circulating heated air therein.

The object of the invention is to provide improvements in the construction of egg trays to permit of a substantially uniform air distribution therearound, and to provide an improved air circulating and heating means.

The objects of the invention are accomplished by a construction as illustrated in the drawings, in which:

Fig. 2 is a front view of the incubator with the front of the cabinet and door partly broken away and parts shown in section.

Fig. 3 is a sectional plan taken on the line 3—3 of Figure 1.

Fig. 4 is a fragmentary detail illustrating the use of an egg turning means in one of the trays constructed according to the present invention.

Fig. 5 is a plan view of the egg turning means.

Figure 1:
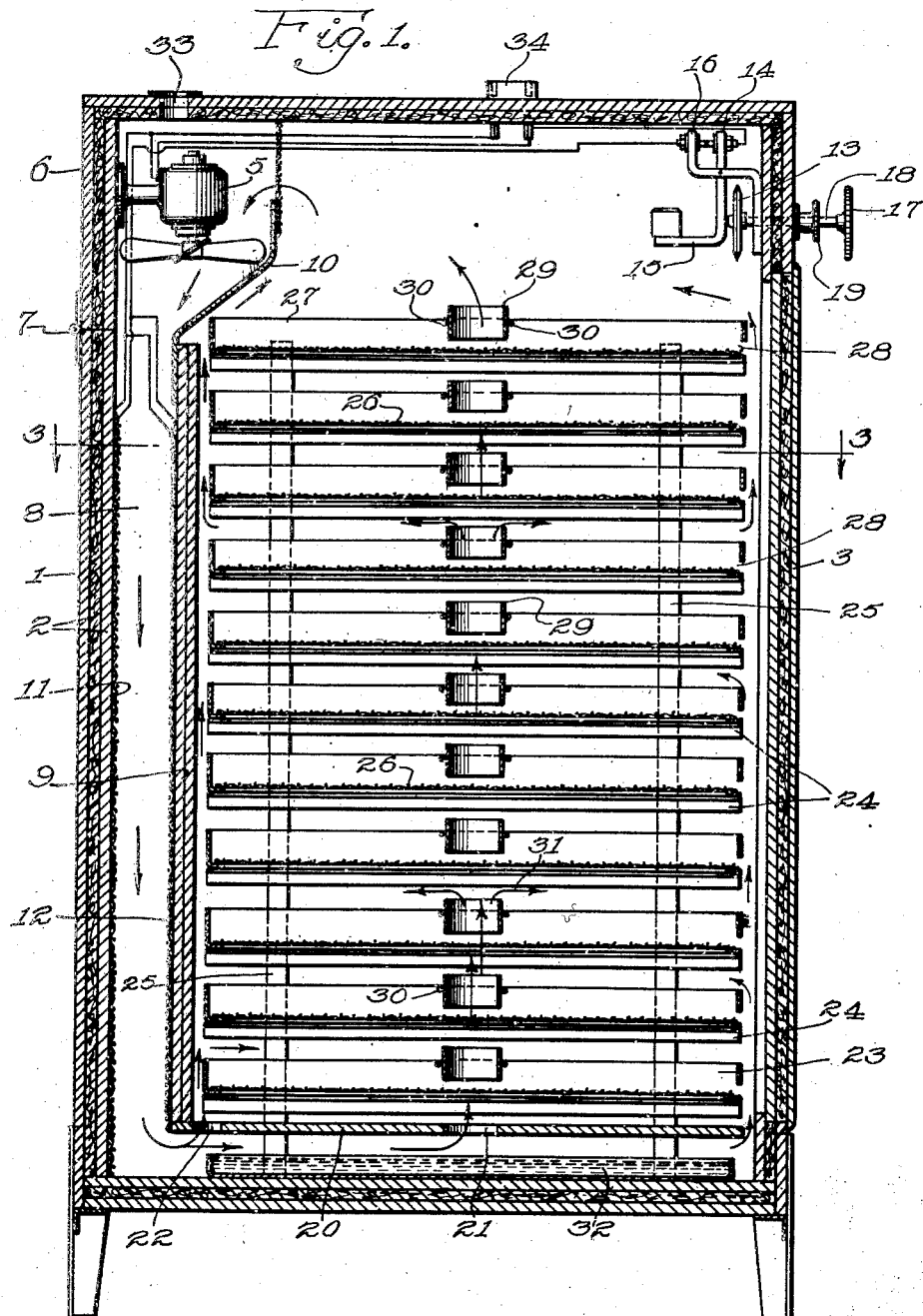
Figure 1 is a longitudinal vertical section of the improved incubator.

The invention is carried out by means of an insulated cabinet, provided with a plurality of egg holding trays, one above the other and accessible through the door in the front of the cabinet, each tray being separately removable through this door, as is customary. The trays, however, are each provided with a central annular air conducting means which prevents the eggs from preventing the passage of air through the perforated bottom plates of the trays, and provide means whereby a column of air may rise centrally throughout the tier of trays and be distributed laterally between the trays as the air conducting means of the trays are spaced apart vertically.

An air heating passageway extends from top to bottom of the cabinet at one side thereof, and is formed by a side wall of the cabinet and a vertical partition. Air is forced downwardly in the space between this partition and the adjacent wall of the cabinet by electric fans mounted within the cabinet, and the air as it travels in such space is heated by electric heating elements, one being preferably located on the wall of the cabinet, and the other on the partition wall to cover a large area thereof.

The heating elements are operated at low temperature under thermostatic control, and the air which is warmed thereby is preferably delivered to the bottom of the cabinet beneath an air deflecting plate, and over a pan of water for humidifying the air. The deflecting plate is arranged to permit the air to rise upwardly around its periphery and through a central aperture therein, in line with the central air conducting devices of each tray.

Referring to the drawings, the incubator cabinet is a rectangular construction including a frame supporting the walls of the cabinet, each of which may consist of an exterior layer of wood 1, and a plurality of interior layers 2 of insulating laminations and wood. The door 3 which is hinged to the front of the cabinet at 4 is similarly constructed.

Air circulating fan motors 5 are supported upon small doors 6 formed in the rear wall of the cabinet and hinged thereto at 7. As shown in Fig. 1, these fans are arranged to drive air downwardly in the space 8, between the rear wall of the cabinet and the vertical partition wall 9, spaced a few inches inwardly from the rear wall.

Extending transversely from side to side of the cabinet, at the upper end of partition wall 9 and attached thereto, is an air guiding plate 10 arranged to conduct downwardly into the space 8 all the air drawn into the fans.

Heating elements 11 are mounted on the inner surface of the rear wall of the cabinet and on the opposing surface of partition 9; thus the air blown downwardly through space 8 is warmed to the required temperature. The heating elements are under the control of a thermostatic element 13, which may expand and rock contact 14 on the pivoted and weighted arm 15, away from the fixed contact 16, and thus open the heating circuits of the heating elements.

The heating elements 11 extend over practically the entire area of the side walls forming the passageway 8. These elements are of simple, inexpensive construction consisting of highly refractory cloth into which is sewn resistance wire in zig-zag or hollow squared formation. The resistance wire extends over substantially all the area of the cloth for the purpose of warming as much air as possible without the necessity of using a high temperature at any one point.

The thermostatic element is adjustable toward and away from arm 15, to become effective at the required temperature, by means of the knurled head 17 on the screw 18 which supports the thermostatic element. The screw 18 engages the internally threaded fixed member 19.

The wall 12 terminates short of the bottom of the cabinet, and in line with the bottom edge of the wall 12 is a horizontally disposed air distributing plate 20 extending from side to side of the cabinet and having openings therein for permitting the air to pass upwardly through the plate. These openings are indicated at 21 and 22. The opening 21 is centrally located beneath the egg supporting trays 23, each of which is rectangular in plan and is supported on horizontally extending angle pieces 24, which in turn are secured to vertically extending cleats 25, fastened to the side walls of the cabinet.

Each egg tray consists of a perforated or screen bottom 26, attached to the metal side walls 27 of the trays. The wall 27 at the front of each tray is cut away to provide a slot 28, through which an egg turning device may be inserted when the door 3 is open.

Each tray carries centrally thereof, in line with the opening 21 of deflecting plate 20, an air conducting element in the form of a collar 29. Each conduit 29 is supported by a pair of wires 30 extending from side to side of each tray and having their ends preferably welded in notches in the side walls 27. The conduits are soldered or otherwise secured to these wires, and are of such dimensions in a vertical direction as to provide a space between the bottom of the conduit and the tray which supports it, and the bottom of the tray above such supporting tray, in order that the air may be distributed laterally, as indicated by arrows 31. These conduits also serve to prevent eggs from being placed in the center of the trays, and thus interfering with the upward travel air through the conduits.

Below the deflecting plate 20 on the bottom wall of the cabinet is a water tray 32. The air in its circulation picks up moisture from tray 32 and is continuously recirculated, except such portion thereof as may escape from the incubator, particularly through the openings 33 on the top wall of the incubator near the fans 5. Air enters these openings, and it may be crowded therethrough when the static pressure is sufficiently high. The air within the cabinet is only slowly changed by this arrangement, and mainly is continuously recirculated therein.

The wiring to the thermostat, electric heaters and fans is as indicated in Fig. 1, from incoming leads which may be plugged into the receptacle 34 on the top of the cabinet.

The egg turning device shown by Figs. 4 and 5, consists of a piece of sheet steel 35 bent at its edges for the purpose of clamping to the surface thereof a rough piece of sacking material 36. Handles 37 are attached to the sides of the sheet 35. The space between the bottoms of the trays and the air conduits 29 mounted therein permits the passage of the egg turning device beneath these conduits, when the egg turning device is inserted through one of the openings 28 and reciprocated beneath the eggs.

In the operation of the incubator, assuming that the trays have been filled with eggs and placed within the cabinet and the front door 3 closed, when the current is turned on, fans 5 are set in operation, and also the heaters 11 and 12.

The air set in motion by the fans is directed downwardly into the space 8 by the guide plate 10 and comes into contact with the electric heating elements 11 and 12, and then enters the space between the floor of the cabinet and distributing plate 20, where it receives moisture from pan 32, and then rises through the openings in the distributing plate, one of said openings 21 being in line with the conduit 29, supported in each tray. These conduits provide a central flue for heated air, except as distributed by the screen bottoms 26 of each tray; the screens and eggs serve to deflect some of the air laterally as indicated by the arrows. The air rising through the stack of trays is again drawn towards the fan 5, is rewarmed and recirculated. Fresh air may enter the openings 33 and mix with the recirculated air. Some of the used air may escape through these openings. The fans are preferably in continuous operation during the operation of the incubator, but the heating elements 11 and 12 are intermittently cut out by the thermostat 13.

Although but one specific embodiment of this invention has been herein shown and described, it will be understood that certain details of the construction shown may be altered or omitted without departing from the spirit of this invention as defined by the following claims.

I claim:

1. An incubator comprising a cabinet, a plurality of egg supporting trays in said cabinet, and spaced apart, one above the other, each of said trays being provided with an open work bottom, and a central air conduit in position to hold eggs away from the center of the tray and to provide a central passageway for air throughout the trays, each of said conduits being spaced away from the bottom of its respective tray and supported by means extending therefrom to the side walls of the tray.

2. An incubator comprising a cabinet, a plurality of horizontally disposed trays slidably mounted therein one above the other, each of said trays being provided with an openwork bottom, an air conducting element centrally located in the tray, a support for said air conducting element extending from a side wall of the tray and holding said air conducting element spaced upwardly from the bottom of the tray, a vertical partition in the cabinet at one side of the trays and forming with a side wall of the cabinet a vertical passageway for air, said partition being formed to provide openings at the top and bottom thereof, an electric heating element in said passageway, and means for forcing air from end to end of said passageway.

3. An incubator comprising a cabinet, a plurality of horizontally disposed trays slidably mounted therein one above the other, each of said trays being provided with an openwork bottom, an air conducting element centrally located in the tray, a support for said air conducting element extending from a side wall of the tray and holding said air conducting element spaced upwardly from the bottom of the tray, a vertical partition in the cabinet at one side of the trays and forming with a side wall of the cabinet a vertical passageway for air, said partition being formed to provide openings at the top and bottom thereof, an electric heating element in said passageway, means for forcing air from end to end of said passageway, and an air distributing plate below the trays having an aperture in alignment with the air conducting elements of the trays.

Signed at Kankakee in the county of Kankakee and State of Illinois this 1st day of May 1931.

JOHN C. BOHMKER.